3,706,531
PROCESS FOR THE MANUFACTURE OF SODIUM SULPHATE
Giorgio Cozza, Gabriele Bottai, and Filippo Barilli, Milan, Italy, assignors to Societa Italiana Resine S.p.A., Milan, Italy
Filed Dec. 7, 1970, Ser. No. 95,744
Claims priority, application Italy, Dec. 23, 1969, 26,203/69
Int. Cl. C01d 5/00; C01q 49/02
U.S. Cl. 423—551
4 Claims

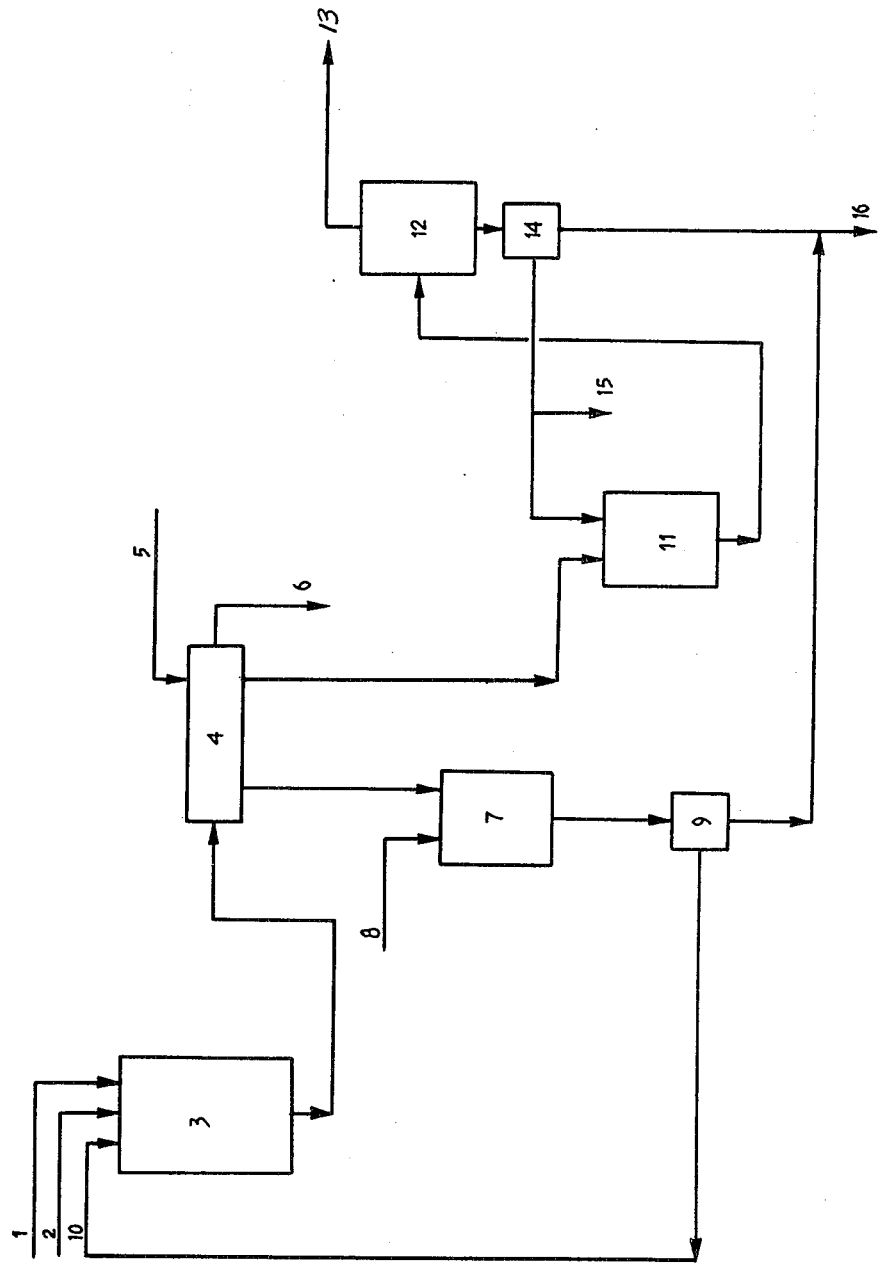
INVENTORS
GIORGIO COZZA
GABRIELE BOTTAI
FILIPPO BARILLI
BY Sughrue, Rothwell, Mion, Zinn & Macpeak
ATTORNEYS United States Patent Office 3,706,531
Patented Dec. 19, 1972

ABSTRACT OF THE DISCLOSURE

Sodium sulphate is made from a solution of the ferrous sulphate by product of titanium dioxide manufacture, by precipitating iron hydroxide with sodium hydroxide, removing the iron hydroxide, precipitating part of the sodium sulphate formed in the solution by adding more sodium hydroxide and recycling the residual liquor to the iron hydroxide precipitation stage.

---

The present invention relates to a process for the manufacture of sodium sulphate from iron sulphate. More particularly, the present invention relates to a process for the manufacture of sodium sulphate from waste products consisting essentially of ferrous sulphate heptahydrate, obtained in the production of titanium dioxide from ilmenite and sulphuric acid.

In view of the limited use of such ferrous sulphate, also in consideration of its high impurities content, and the fact that its direct disposal gives rise to considerable pollution, it is necessary to convert it to products which offer no disposal problems and preferably into useful products.

It has now been found possible to transform iron sulphate obtained as a by-product in the process of manufacturing titanium dioxide from ilmenite and sulphuric acid, into a useful product consisting of sodium sulphate and a product which can be disposed of directly with no danger of chemical pollution, consisting substantially of ferrous hydroxide.

It is therefore an object of the present invention to provide a process by which it is possible to convert ferrous sulphate into sodium sulphate.

Another object of the present invention is the production of substantially pure sodium sulphate from iron sulphate obtained as a by-product in the process of manufacturing titanium dioxide from ilmenite and sulphuric acid.

It is a further object of the present invention to provide a simple and economically advantageous process by which it is possible to produce substantially pure sodium sulphate.

The process of the present invention consists essentially in continuously supplying to an agitated vessel and in the presence of air iron sulphate and an aqueous solution comprising sodium hydroxide, the quantity and concentration of sodium hydroxide supplied being such as to cause precipitation of the iron as iron hydroxide without causing simultaneous precipitation of the sodium sulphate; in separating the precipitate from the reaction product; in adding to the residual solution, after removal of the precipitate, an excess of sodium hydroxide so as to cause precipitation of part of the sodium sulphate; in recovering the precipitated sodium sulphate; in recycling the residual solution to the vessel for the iron sulphate.

More precisely, an aqueous solution of sodium hydroxide and sodium sulphate is fed to the iron sulphate vessel so that the resultant pH in the reaction medium is comprised between 7 and 12 and so that the number of parts by weight of solid matter per 100 parts of liquid are comprised between 1 and 18.

By working at a temperature preferably in the range from 40 to 120° C. and when a stream of oxygen or other gas containing oxygen is present in the liquid, a virtually complete separation of the iron and other impurities present is achieved. Furthermore, such conditions make it possible to perform the successive filtration operation very easily. The residual solution obtained after separation of the solid phase by filtration, has a sodium hydroxide solution added to it in a concentration and quantity such as will partly precipitate the sodium sulphate present. More precisely, in such an operation, a proportion by weight of sodium hydroxide:sodium sulphate of between 0.16:1 and 17.5:1 will be maintained in the liquid phase.

The precipitated sodium sulphate may be separated by the ordinary methods known in the art, such as for example by the use of a centrifuge, while the mother liquor is fed back continuously to the reaction vessel after any addition of sodium hydroxide.

Particularly advantageous results are obtained when the waste products obtained from the manufacture of titanium dioxide from ilmenites via sulphuric acid are supplied to the iron sulphate reaction vessel.

These products, constituted essentially of ferrous sulphate heptahydrate, are of limited use, also by virtue of their high content of other compounds which cannot be economically separated, such as compounds of titanium, aluminum, magnesium, calcium, manganese, chromium, vanadium, etc.

Furthermore, the direct disposal of such products causes considerable pollution.

By proceeding according to the present invention, it is possible to obtain from such waste products and by a simple and economic method sodium sulphate to a high degree of purity (>99%) and a product which can be disposed of directly without danger of chemical pollution, consisting essentially of ferrous hydrate.

The attached figure represents a preferred embodiment of the present invention.

Referring to the aforesaid figure, the waste products consisting essentially of ferrous sulphate heptahydrate obtained in the manufacture of titanium dioxide from ilmenite and sulphuric acid and the solution comprising sodium hydroxide are supplied to the reaction vessel 3 respectively through lines 1 and 10.

On the other hand, a flow of air is passed through the line 2. The product obtained when proceeding under the above conditions is subjected to filtration in a filtering system 4. Such filtration is carried out so as to separate two solutions with a differing concentration of sodium sulphate. More preferably, working is carried out with a filtration system, for example a rotary or strip filter, in which initially the most concentrated solution is separated and then, after washing with water supplied through the line 5, the more diluted solution is separated. When the process of the present invention is carried out continuously, the two solutions emerge simultaneously from two separate lines.

The thus filtered solution with greater concentration of sodium sulphate is transferred to a vessel 7 to which, by means of the line 8, an aqueous solution of sodium hydroxide is added to achieve partial precipitation of the sodium sulphate present in solution.

The temperature of such vessel is preferably maintained between 40 and 120° C.

The sodium hydroxide is added so as to establish in the solution, obtained after separation of the precipitated sodium sulphate in 9, for example by means of a centrifuge, a sodium hydroxide concentration of between 5 and 35 g. per 100 g. of water and with 2 to 30 g. sodium sulphate per 100 g. of water. This solution may be caused to recycle directly, with no further additions of soda, along the line 10 in the reaction vessel 3 to which the ferrous sulphate heptahydrate is supplied through 1 so as to satisfy the conditions set out hereinabove.

A stream of air is supplied through the line 2. The sodium sulphate separated at 9, after washings with aqueous solutions of sodium sulphate, is discharged through the line 16. The solution with a lesser concentration of sodium sulphate, obtained at 4, is transferred to the vessel 11 and thence into a concentrator 12 where the water separated is eliminated through 13. The product obtained is separated in 14, for example by a centrifuge, from the precipitated sodium sulphate which is discharged through the line 16.

The mother liquor obtained is recycled in 11. The line 15 constitutes a small continuous drain which avoids co-precipitation of undesired substances together with the sodium sulphate in 12. This drain may if necessary be recycled in 7 or may be discharged directly.

The solid matter obtained in filtration at 4, consisting essentially of ferrous hydroxide and other impurities initially present in the ferrous sulphate heptahydrate is discharged directly through the line 6 with no danger of chemical pollution.

After it has been dried, the sodium sulphate obtained in 16 has a purity in excess of 99% by weight.

The invention will now be illustrated by the following example which does not however imply any limitation on the invention itself.

EXAMPLE

Referring now to the attached figure, a product consisting of 87% by weight of ferrous sulphate heptahydrate, obtained in the production of titanium dioxide from ilmenite and sulphuric acid, has been fed together with an aqueous solution containing 17.5 g. sodium hydroxide to 100 g. of water and 140 g. sodium sulphate to 100 g. of water, to the reaction vessel 3, through lines 1 and 10 respectively.

The process was carried out at a temperature of 98° C., air being bubbled through the line 2.

The reagents were supplied so that the pH of the reaction medium was equal to 11 and so that the product emerging at the base of the vessel had a proportion of 11 parts solid matter by weight to 100 parts by weight of liquid. This product was subjected to filtration in a drum filter system 4, which at the same time separated the two solutions of different concentration of sodium sulphate.

The more concentrated solution, with a concentration of sodium sulphate equal to 26% by weight, was transferred to a vessel 7, to which a 50% sodium hydroxide aqueous solution was added through the line 8. The temperature of the vessel was maintained at 80° C.

The addition was carried out in such a way as to regenerate the reaction solution in 3, which was recycled by means of the line 10 after separation of the precipitated sodium sulphate. This precipitate, after having been separated in 9 by a centrifuge and after having been washed with a solution containing sodium sulphate, was discharged by means of the line 16.

The less concentrated solution, with a concentration equal to 22% by weight, obtained in filtration at 4 by washing with water supplied through the line 5, was transferred to the vessel 11 and from there into a concentrator 12 in which the water separated was eliminated at a temperature above 40° C., by means of the line 13.

By means of a centrifuge, the product obtained was separated at 14 from the precipitated sodium sulphate which was discharged through the line 16.

The mother liquor obtained was recycled in 11, while a small part of it was drained off through the line 15. The solid mass obtained in the filtration system 4, consisting of ferrous hydroxide and the other impurities initially present in the ferrous sulphate heptahydrate, was finally discharged through the line 6, without causing chemical pollution. The sodium sulphate obtained in 16, after washing with a sodium sulphate solution and subsequent drying, exhibited a purity of better than 99% by weight.

We claim:

1. A continuous process for preparing sodium sulphate from a waste product consisting essentially of ferrous sulphate which contains impurities such as compounds of titanium, aluminum and other metals normally present as the waste products in the manufacture of titanium dioxide via sulphate comprising:
   (a) supplying to an agitated reactor which is maintained at a temperature within the range of 40 to 120° C. a reaction medium of:
      (1) gaseous oxygen or a molecular oxygen containing gas,
      (2) ferrous sulphate and said impurities, and
      (3) an aqueous solution comprising sodium hydroxide and sodium sulphate,
         said aqueous solution having a weight ratio of sodium hydroxide to sodium sulphate within the range of 0.16:1 to 17.5:1,
         said reaction medium having a resulting pH between 7 and 12 and having within 1 to 18 parts by weight of solid to 100 parts by weight of liquid;
   (b) removing the reaction product from the reactor and filtering said reaction product to separate the precipitate which consists essentially of ferrous hydroxide and hydroxides of the other metal impurities present whereby a residual solution is obtained;
   (c) mixing said residual solution obtained after separation of the precipitate with excess sodium hydroxide to cause precipitation of sodium sulphate;
   (d) separating and recovering the precipitated sodium sulphate whereby a residual aqueous solution from the separation of the sodium sulphate is obtained which comprises sodium hydroxide and sodium sulphate with a weight ratio of sodium hydroxide to sodium sulphate within the range of 0.16:1 to 17.5:1; and
   (e) recycling said residual aqueous solution from the separation of the precipitated sodium sulphate to the agitated reactor of step (a).

2. A process according to claim 1, further comprising washing the ferrous hydroxide being filtered in step (b) with water to obtain a second aqueous solution containing a lower concentration of sodium sulphate, recovering said second aqueous solution and subjecting the solution to a concentrator whereby additional sodium sulphate precipitates and recovering said sodium sulphate precipitate while recycling the residual solution back to the concentrator.

3. A process according to claim 1, wherein the ferrous sulphate containing impurities consists essentially of ferrous sulphate heptahydrate obtained as a by-product in the process of manufacturing titanium dioxide from ilmenites and sulphuric acid.

4. The process according to claim 1, wherein the sodium sulphate obtained has a high purity of greater than 99%.

References Cited

UNITED STATES PATENTS

| | | | |
|---|---|---|---|
| 2,333,672 | 11/1943 | Oliver | 23—121 X |
| 2,443,765 | 6/1948 | Francis | 23—200 X |
| 2,218,117 | 10/1940 | Marek | 23—200 X |
| 2,133,267 | 10/1938 | Ayers | 23—200 |
| 2,785,991 | 3/1957 | Bennetch | 23—200 |
| 2,939,767 | 6/1960 | Martin | 23—200 |
| 3,288,563 | 11/1966 | Klomp et al. | 23—200 |

EDWARD STERN, Primary Examiner

U.S. Cl. X.R.

423—632